United States Patent [19]

Beall et al.

[11] Patent Number: 4,526,873
[45] Date of Patent: Jul. 2, 1985

[54] TRANSPARENT, MULLITE GLASS-CERAMICS CONTAINING ZNO AND METHOD

[75] Inventors: George H. Beall, Big Flats; Nicholas F. Borrelli, Elmira; David L. Morse, Corning, all of N.Y.

[73] Assignee: Corning Glass Works, Corning, N.Y.

[21] Appl. No.: 627,073

[22] Filed: Jul. 2, 1984

[51] Int. Cl.³ .................. C03C 3/22; C09K 11/10
[52] U.S. Cl. .................. 501/5; 252/301.6 F;
501/67; 501/79; 501/904
[58] Field of Search .............. 501/5, 67, 79, 904;
252/301.6 F, 301.6 R

[56] References Cited

U.S. PATENT DOCUMENTS

| | | | |
|---|---|---|---|
| 2,447,448 | 8/1948 | Williams | 252/301.6 F |
| 3,440,172 | 4/1969 | Albinak et al. | 252/301.6 R |
| 3,681,102 | 8/1972 | Beall | 252/301.6 F |
| 4,396,720 | 8/1983 | Beall et al. | 501/5 |

*Primary Examiner*—Helen M. McCarthy
*Attorney, Agent, or Firm*—C. S. Janes, Jr.

[57] ABSTRACT

There is disclosed an improved, transparent, mullite glass-ceramic doped with $Cr_2O_3$ to fluoresce in the 650-900 nm. region of the spectrum and having an absorption peak centered at about 600 nm. The improvement is inclusion in the composition of 2-15% by weight of ZnO and sufficient MgO, if necessary, to provide at least 5% ZnO+MgO. The ZnO or ZnO—MgO components selectively shift the absorption peak centered at 600 nm. toward the lower (blue) end of the spectrum.

5 Claims, 2 Drawing Figures

TRANSPARENT, MULLITE GLASS-CERAMICS CONTAINING ZNO AND METHOD

U.S. Pat. No. 4,396,720 (Beall et al.), issued Aug. 2, 1983, discloses substantially transparent, glass-ceramic articles containing mullite as the predominant, if not the sole, crystal phase. The precursor glasses are capable of being melted at temperatures no higher than 1650° C., and may be crystallized at viscosities in the range of $10^9$ to $10^{12}$ poises. They consist essentially, in weight percent, as calculated on an oxide basis, of 10–70% $SiO_2$, 7–40% $B_2O_3$, 14–50% $Al_2O_3$, 0–35% RO, wherein RO consists of at least one member of the group in the indicated proportions of 0–15% MgO, 0–20% CaO, 0–30% SrO, 0–30% BaO, and 0–30% PbO, and 0–30% $R_2O$, wherein $R_2O$ consists of at least one member of the group in the indicated proportions of 0–10% $Li_2O$, 0–15% $Na_2O$, 0–25% $K_2O$, 0–30% $Rb_2O$, and 0–30% $Cs_2O$, the mole ratio $Al_2O_3$:RO+$R_2O$>1.3.

Where 0.01–1% $Cr_2O_3$ is included in the composition, the glass-ceramic will exhibit broad absorption over the visible region of the radiation spectrum and strong fluorescence in the red and near infrared portions of the spectrum when exposed to ultraviolet and/or visible radiation. Such chromium-doped glass-ceramics find application, inter alia, in infrared laser and solar collector equipment.

As disclosed in the Beall et al. patent, the broad absorption over the visible range is characterized by two main bands centered at 400 and 600 nanometers (nm); the fluorescence engendered by ultra-violet and visible light absorption in the region of 650 to 900 nm. Although the overlap of absorption and fluorescence is not great, the proximity of the absorption band centered at 600 nm is sufficient so that self-absorption of some fluorescence does become a problem in such applications as solar collection.

PURPOSE OF THE INVENTION

A basic purpose is to provide improvements in the chrome-doped, transparent, mullite glass-ceramics disclosed in U.S. Pat. No. 4,396,720.

A more particular purpose is to provide a means of minimizing the effect that the visible absorption band centered at 600 nm has on the fluorescent region, and thus avoid loss of fluorescence in such glass-ceramic materials.

SUMMARY OF THE INVENTION

One aspect of the invention is a substantially transparent, glass-ceramic article containing mullite as the predominant, and preferably only, crystal phase, containing 0.01 to 1.0% $Cr_2O_3$ as a dopant to provide fluorescence in the near infrared when activated by ultra-violet or visible radiation, having a base composition consisting essentially of, on a calculated oxide basis, 10–70% $SiO_2$, 7–40% $B_2O_3$, 14–50% $Al_2O_3$, 0–35% RO wherein RO consists of 0–15% MgO, 0–20% CaO, 0–30% SrO, 0–30% BaO, and 0–30% PbO, and 0–30% $R_2O$ wherein $R_2O$ is 0–10% $Li_2O$, 0–15% $Na_2O$, 0–25% $K_2O$, 0–30% $Rb_2O$ and 0–30% $Cs_2O$, the mole ratio of $Al_2O_3$:RO+$R_2O$>1.3, and characterized by the inclusion of 2–15% ZnO in the composition, the ZnO+MgO content being at least 5%. Preferably, the ZnO content does not exceed about 12%.

The invention further contemplates a method of selectively shifting the 600 nm absorption band in a chrome-doped, mullite glass-ceramic, as just described, to lower wavelengths by incorporating a source of 2 to 15% ZnO in the batch from which the parent glass is melted, the batch further containing, when the ZnO content is below 5%, a source of magnesia whereby the ZnO+MgO content is at least 5%.

GENERAL DESCRIPTION

It is disclosed in the Beall et al. patent that the presence of up to one percent of trivalent chromium in a transparent, mullite glass-ceramic causes a broad absorption over the visible range of the spectrum with two main absorption bands centered at about 400 nm and 600 nm. Further, it causes a red fluorescence to occur in the range of 650–900 nm.

As previously noted, the close proximity of the 600 nm absorption band to the fluorescing zone results in some absorption of the luminescent light. The present invention remedies this by shifting the 600 nm absorption band to lower wavelengths removed from the area of fluorescence.

The invention is based on our discovery that the absorption band normally centered at 600 nm can be shifted by as much as 70 nm to where it is centered at 530 nm. Further, it is found that this can be accomplished without any appreciable effect on the absorption curve at shorter wavelengths, in particular the absorption band centered at 400 nm or the transmission maximum (window) near 480 nm.

It has been observed that the 600 nm centered band shifts continuously lower as zinc oxide (ZnO) is added to the composition. A minimum of at least 5% appears necessary to achieve any substantial effect, although the ZnO content may be as low as 2% if MgO is present. While MgO alone may be effective to shift the 600 nm. band, we prefer to use ZnO alone, or supplemented with MgO at lower levels below 5%. ZnO-containing glass-ceramics appear to give generally better overall fluorescent effects, possibly due to preference for the tetrahedral sites as explained below.

It has further been observed that the greenish-grey hue of the normal chrome-doped glass-ceramic is changed to a purplish-grey color as red transmission is enhanced and green is diminished. Additions of ZnO greater than about 12% by weight hazard the creation of haze in the glass-ceramic, possibly because of crystal growth. Accordingly, a ZnO content of 2 to 12% is preferred.

While the absorption shift is generally noticed in transparent, mullite glass-ceramics doped with trivalent chromium, optimum results with ease of control are achieved in base compositions composed of 55–60% $SiO_2$, 15–20% $B_2O_3$, 20–25% $Al_2O_3$, and 2–5% $Na_2O$ and/or $K_2O$ with 2–12% ZnO and a ZnO+MgO content of at least 5%.

It is known that $Zn^{+2}$ ions prefer tetrahedral sites in zinc silicates such as willemite. It seems likely then, from an examination of the structure of mullite, that $Zn^{+2}$ ions would be expected to enter the distorted tetrahedral site M2 (see for example Bragg et al., Crystal Structure of Minerals, Cornell, 1965) in place of $Al^{+3}$, while equivalent substitutions of $Si^{+4}$ for $Al^{+3}$ in M1 balance the change as follows:

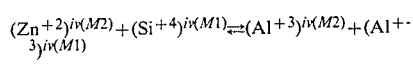

where Roman numerals refer to coordination and M numbers refer to sites. Alternatively, the phenomenon might be explained in this manner:

$$2(Zn^{+2})^{iv(M2)} + \square^{(O3)} \rightleftharpoons 2(Al^{+3})^{iv(M2)} + O^{-2(O3)}$$

In this equation, further oxygen vacancies (O3) in the mullite structure are produced by replacement of Al by Zn ions to maintain charge balance.

Fluorescence measurements indicate a minor shift toward longer wavelengths in the emission vs. wavelength curves of $Cr^{+3}$ fluorescence as the ZnO or ZnO+MgO content is increased in Cr-doped mullite glass-ceramics.

PRIOR LITERATURE

The use of ZnO in glass compositions to impart luminescence thereto has been practiced for many years, as is illustrated in U.S. Pat. Nos. 2,049,765, 2,219,895, and 2,255,109. However, those disclosures have no reference to the capability of ZnO to selectively shift an absorption peak in the visible region of the radiation spectrum to a lower wavelength, that phenomenon constituting the crux of the present invention.

DESCRIPTION OF THE PREFERRED EMBODIMENTS

Figure 1:
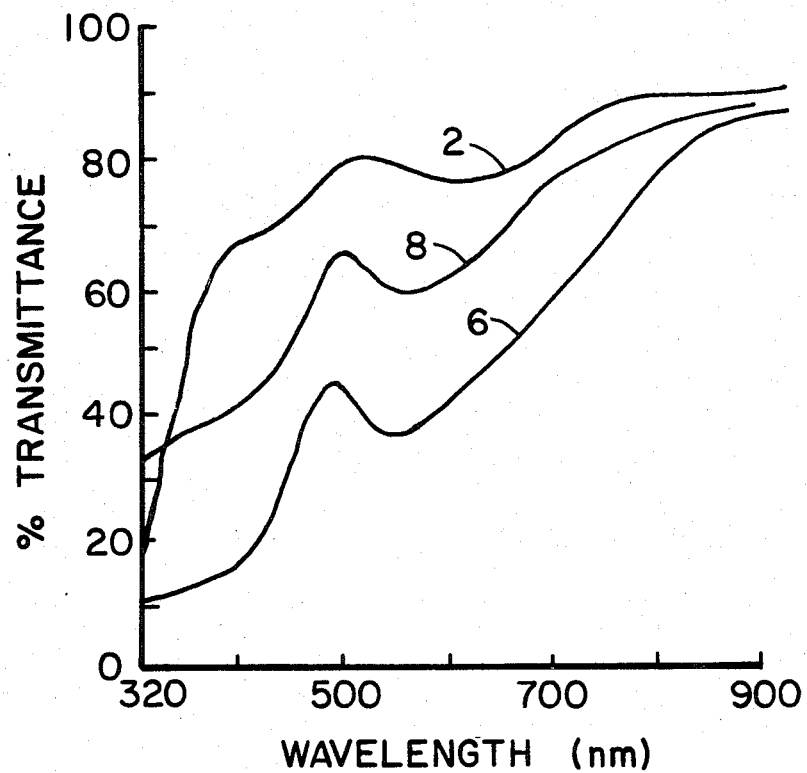
FIG. 1 of the drawing is a graphical representation of transmission curves illustrating the absorption shift achieved with the invention.

TABLE I records a number of parent glass compositions, expressed in terms of parts by weight on the oxide basis, illustrating the parameters of the present invention. Because the sum of the individual components totals or closely approximates 100, for all practical purposes the reported values can be deemed to reflect weight percent. An approximate mole ratio $Al_2O_3$:$RO+R_2O$ is also reported for each composition. The actual batch ingredients may comprise any materials, either the oxide or other compound, which, when melted together, will be converted into the desired oxide in the proper proportions.

The constituents for each of the tabulated exemplary compositions were compounded, ballmilled together to assist in achieving a homogeneous melt, and then placed into platinum crucibles. The crucibles containing batches for Examples 2–8 were introduced into a furnace operating at 1650° C. and the batches melted for 4–16 hours. The batch of Example 1 required a higher melting temperature of 1800° C. The melts were poured into steel molds to produce slabs having the dimensions of about 4"×4"×½" or 4"×8"×½", and those slabs were immediately transferred to an annealer operating at about 600° C., except for Example 1 which was annealed at 700° C.

TABLE I

| Oxide | 1 | 2 | 3 | 4 | 5 | 6 | 7 | 8 |
|---|---|---|---|---|---|---|---|---|
| SiO₂ | 50 | 45 | 52.5 | 53.5 | 48 | 48 | 44 | 44 |
| B₂O₃ | 0 | 15 | 17.5 | 15.0 | 24 | 20 | 17.5 | 17.5 |
| Al₂O₃ | 40 | 30 | 22.5 | 20.0 | 21 | 21 | 25.0 | 25.0 |
| BaO | 10 | — | — | — | — | — | — | — |
| K₂O | 0 | 10 | — | 2.5 | 2 | 2 | 3.5 | 3.5 |
| Na₂O | — | — | 2.5 | — | — | — | — | — |
| MgO | — | — | — | — | 3 | — | — | — |
| ZnO | — | — | 5.0 | 9.0 | 2 | 9 | 10.0 | 10.0 |
| Cr₂O₃ | 0.05 | 0.05 | 0.10 | 0.20 | 0.1 | 0.1 | 0.10 | 0.05 |
| As₂O₃.₅ | — | — | — | — | — | — | — | 0.2 |
| Al₂O₃/RO + R₂O | 6.0 | 2.86 | 2.16 | 1.43 | 1.71 | 1.56 | 1.53 | 1.53 |

All original glass samples were transparent and green in color. TABLE II recites the heat treatment schedule, in temperature and time (°C.-hours), employed to generate crystallization in situ of the glass, the visual appearance of each glass-ceramic thus produced, and the approximate center (in nm.) of the upper absorption band. This center normally occurs at about 600 nm., as in Examples 1 and 2, and is identified as the "600" band in TABLE II. All samples exhibited visible red fluorescence when treated as follows: The specimens were cut to dimensions of about 1.5"×1.5"×0.25", and then irradiated with an ultraviolet lamp having a principal zone of radiation at about 3660Å.

In each heat treatment schedule recorded, the glass slab was introduced into an electrically-fired furnace and the temperature raised therein at about 5° C./minute, except where noted otherwise, to the stated dwell periods. After completing the top temperature hold, the electricity to the furnace was merely cut off and the bodies allowed to cool to room temperature within the furnace. This practice has been termed "cooling at furnace rate" by the glass-ceramic art.

TABLE II

| Example | Heat Treatment | Glass-Ceramics Appearance | Absorption Maximum (nm) "600" band |
|---|---|---|---|
| 1 | 950-4 | Grey-brown | 610 |
| 2 | 750-4 | Turquoise-grey | 600 |
| 3 | 750-2 | Purplish grey | — |
|   | 850-4 | Slight haze |   |
| 4 | 700-2 | Dark purplish | 550 |
|   | 750-4 | grey |   |
|   |   | Clear |   |
| 5 | 750-2 | grey | — |
|   | 800-4 | Slight haze |   |
| 6 | 750-2 | grey | 530 |
|   | 800-4 | Slight haze |   |
| 7 | 750-4 | Purplish grey | — |
|   |   | Clear |   |
| 8 | 700-2 | Purplish grey | 545 |
|   | 750-4 | Clear |   |

In TABLE I, Examples 1 and 2 are compositions formulated in accordance with earlier teachings, Example 2 being taken from the earlier mentioned Beall et al. patent. In particular, these compositions do not contain any zinc oxide. However, glasses having these compositions produce a transparent, mullite glass-ceramic when heat treated. Examples 3–8 are compositions formulated in accordance with the present invention, that is, with contents of zinc oxide in the 2–15% range with a ZnO—MgO total content of at least 5%. The glasses having these compositions likewise produce transparent, mullite glass-ceramics when heat treated.

The invention is further illustrated by reference to the appended drawings. FIG. 1 comprises spectral transmission curves for polished glass plates having compositions of Examples 2, 6 and 8. In the graphical presentation, transmitted wavelengths in nanometers (nm) are plotted along the horizontal, and percent transmittance is plotted along the vertical axis.

The Example 2 plate was polished to a thickness of approximately 4 mm, that of Example 6 to a thickness of about 7.5 mm, and that of Example 8 to about 10 mm thickness. The 4 mm plate, as expected, has a substantially higher overall transmission. This is not significant here, however, since interest resides in the absorption bands, that is, the downward dips in the curves.

Transmittance values were obtained utilizing a Varian Cary 17 DX spectrophotometer. The curve labeled 2 is based on transmittance data measured on the 4 mm polished sample of Example 2. The other two curves are based on transmittance data measured on the sample plates of Examples 6 and 8 and are identified by the example numbers.

It is readily apparent that an absorption band in the glass-ceramic of Example 2 is centered almost at 600 nm. It is equally apparent that this band is centered rather lower in the ZnO-containing samples. Thus, in the sample plate of Example 6 the corresponding band is centered at about 530 nm., whereas, in the sample of Example 8 the band is centered at about 545° C.

Figure 2:
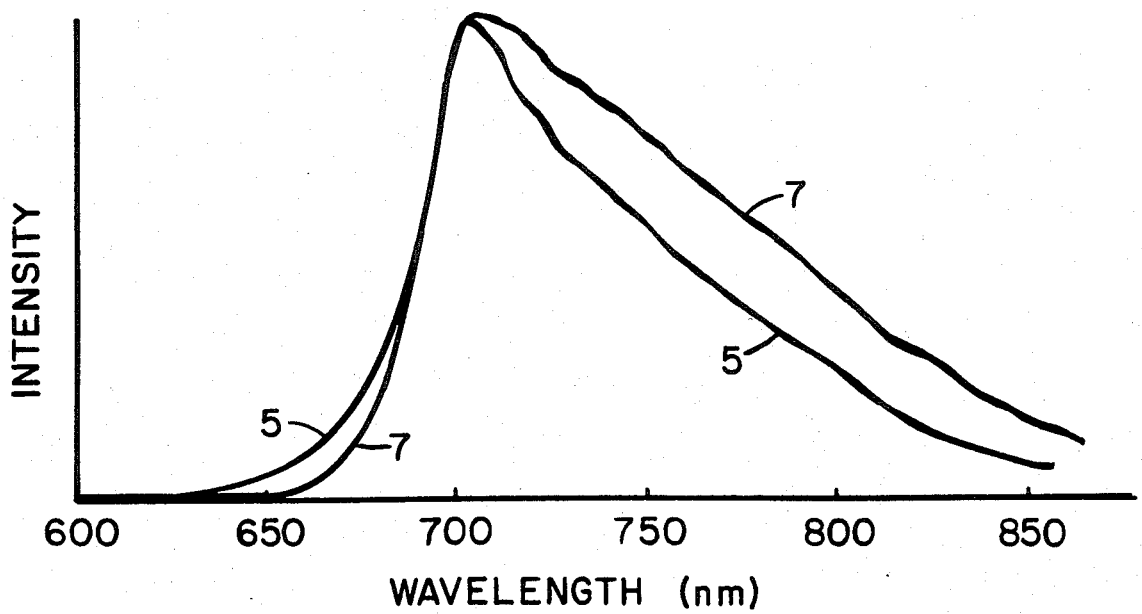
FIG. 2 is a graphical representation of fluorescence in chrome-doped glass-ceramics in accordance with the invention.

FIG. 2 illustrates the nature of the fluorescence obtained from the present glass-ceramics. In the graph, wavelengths between 600 and 850 nms. are plotted along the horizontal axis while intensity of fluorescence is plotted in arbitrary units along the vertical.

Fluorescent spectra were recorded on a Jarrell-Ash $\frac{1}{2}$ meter monochromator with a 1200 groove/mm. grating and curved slits. A cooled Amperex 150 CVP phototube, a tube with good red sensitivity and an S-1 response, was used as a detector. The excitation source was the 514.5 line of a Spectra-Physics argon ion laser.

Measurements were made on glass samples having compositions 5 and 7 of TABLE I. Characteristically, the present materials show a fluorescence peak at around 700 nm. They also show a varying degree of ruby-type structure in the 650-700 nm. region and broadening of the red spectra out to about 850 nm. In these respects then, the sample of Example 7 composition is preferred since it shows more fluorescent energy at the longer wavelengths which are further removed from the "600" absorption band. Further, very little of its fluorescent energy occurs below 675 nm. where self absorption of $Cr^{+3}$ is strong.

We claim:

1. In a substantially transparent glass-ceramic article containing mullite as the predominant crystal phase and consisting essentially, expressed in terms of weight percent on the oxide basis, of 10-70% $SiO_2$, 7-40% $B_2O_3$, 14-50% $Al_2O_3$, at least one each of RO and $R_2O$, wherein the mole ratio $Al_2O_3$:RO+$R_2O$>1.3, the glass-ceramic further containing 0.01-1.0% $Cr_2O_3$, whereby the glass-ceramic demonstrates a broad absorption over the visible region of the radiation spectrum with absorption peaks centered at about 400 and 600 nm and exhibits strong fluorescence in the red and near infrared portions of the spectrum when activated by ultra-violet and/or visible radiation, the improvement comprising RO content of 2 up to about 15% ZnO in the composition, and ZnO+MgO content being at least 5%, to shift the absorption peak centered at about 600 nm toward the lower (blue) end of the spectrum.

2. A glass-ceramic article in accordance with claim 1 wherein the content of ZnO is from 2 to about 12% with the ZnO+MgO content being at least 5%.

3. A method for selectively shifting to a lower wavelength the absorption peak centered at about 600 nm exhibited by a substantially transparent glass-ceramic article containing mullite as the predominant crystal phase and having a composition consisting essentially, expressed in terms of weight percent on the oxide basis, of 10-70% $SiO_2$, 7-40% $B_2O_3$, 14-50% $Al_2O_3$, at least one each of RO and $R_2O$, wherein the mole ratio $Al_2O_3$:RO+$R_2O$>1.3, and doped with fluorescing additive 0.01-1.0% $Cr_2O_3$, said method comprising incorporating as RO 2-15% ZnO into said composition, together with MgO to provide a ZnO+MgO content of at least 5% when the ZnO content is below 5%.

4. The method of claim 3 wherein from 2 up to 12% ZnO is incorporated in the batch.

5. In a glass-ceramic article composed essentially, expressed in terms of weight percent on the oxide basis, of 10-70% $SiO_2$, 7-40% $B_2O_3$, 14-50% $Al_2O_3$, at least one each of RO and $R_2O$, wherein the mole ratio $Al_2O_3$:RO+$R_2O$>1.3, the glass-ceramic further containing 0.01-1.0% $Cr_2O_3$, whereby the glass-ceramic demonstrates a broad absorption over the visible region of the radiation spectrum with absorption peaks centered at about 400 and 600 nm and exhibits strong fluorescence in the red and near infrared portions of the spectrum when activated by ultra-violet and/or visible radiation, the method of selectively shifting the absorption peak centered at about 600 nm to a lower wavelength which comprises providing a base glass batch which upon melting and subsequent crystallizing heat treatment will produce a transparent, mullite glass-ceramic, including RO source of from 2 up to about 15% ZnO in the glass batch, further including a source of MgO in the batch when the ZnO content is below 5%, the ZnO+MgO being at least 5%, melting the glass batch and subjecting the resulting glass to a crystallizing heat treatment.

* * * * *